(No Model.)

11 Sheets—Sheet 1.

R. L. PUCIATA.
FURNACE.

No. 567,611.

Patented Sept. 15, 1896.

WITNESSES:
J. B. Bolton
H. van Oldenneel

INVENTOR
Richard Leon Puciata
BY
Richard R.
ATTORNEYS (No Model.) 11 Sheets—Sheet 2.
R. L. PUCIATA.
FURNACE.
No. 567,611. Patented Sept. 15, 1896.
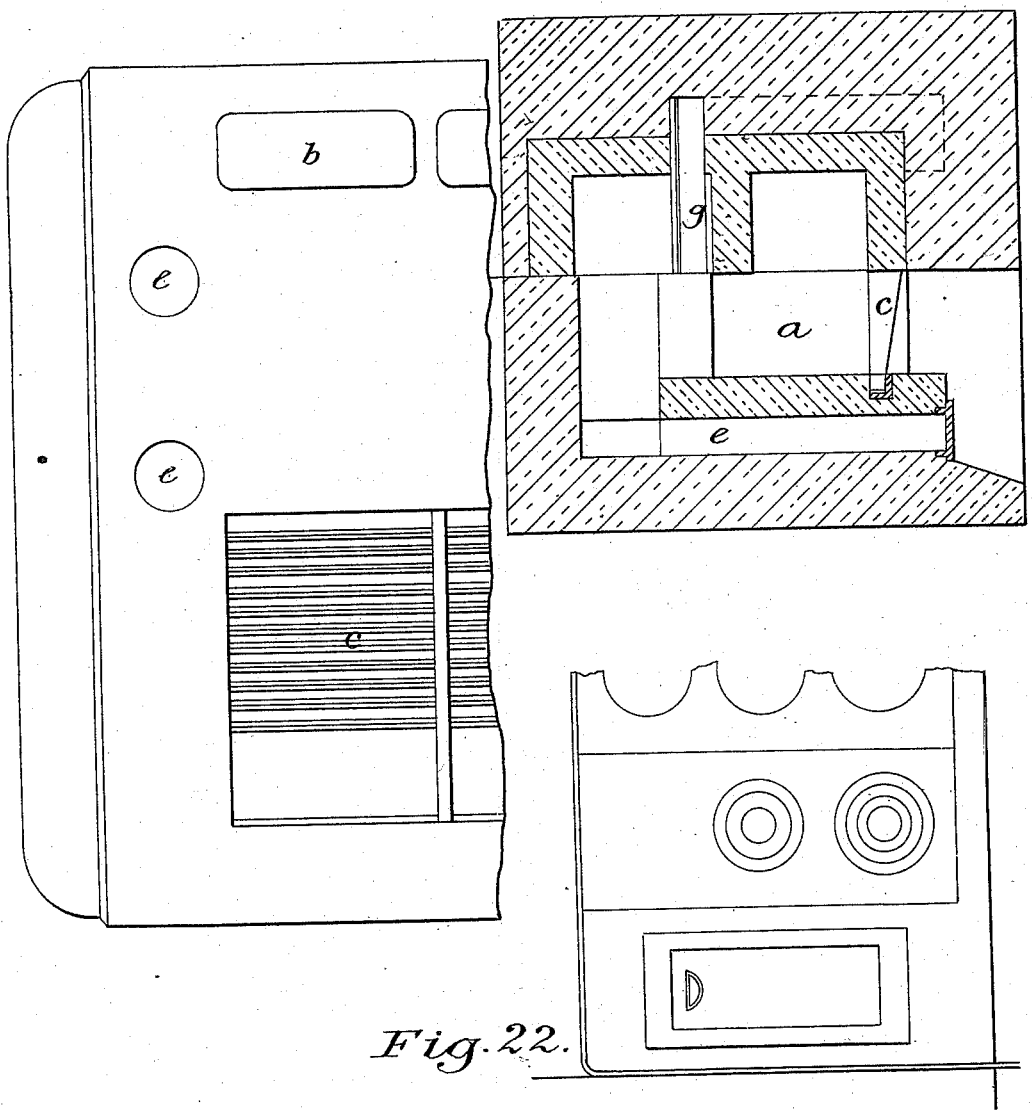
WITNESSES:
E. B. Bolton
H. van Oldenneel
INVENTOR
Richard Leon Puciata
BY
Richard
ATTORNEYS (No Model.) 11 Sheets—Sheet 3.
R. L. PUCIATA.
FURNACE
No. 567,611. Patented Sept. 15, 1896.

WITNESSES:

INVENTOR
Richard Leon Puciata
BY
ATTORNEYS (No Model.) 11 Sheets—Sheet 4.

R. L. PUCIATA.
FURNACE.

No. 567,611. Patented Sept. 15, 1896.

WITNESSES:

INVENTOR
Richard Leon Puciata
BY
ATTORNEYS (No Model.)

11 Sheets—Sheet 5.

R. L. PUCIATA.
FURNACE.

No. 567,611.

Patented Sept. 15, 1896.

WITNESSES:

INVENTOR
Richard Leon Puciata
BY
ATTORNEYS (No Model.) 11 Sheets—Sheet 6.
R. L. PUCIATA.
FURNACE.
No. 567,611. Patented Sept. 15, 1896.
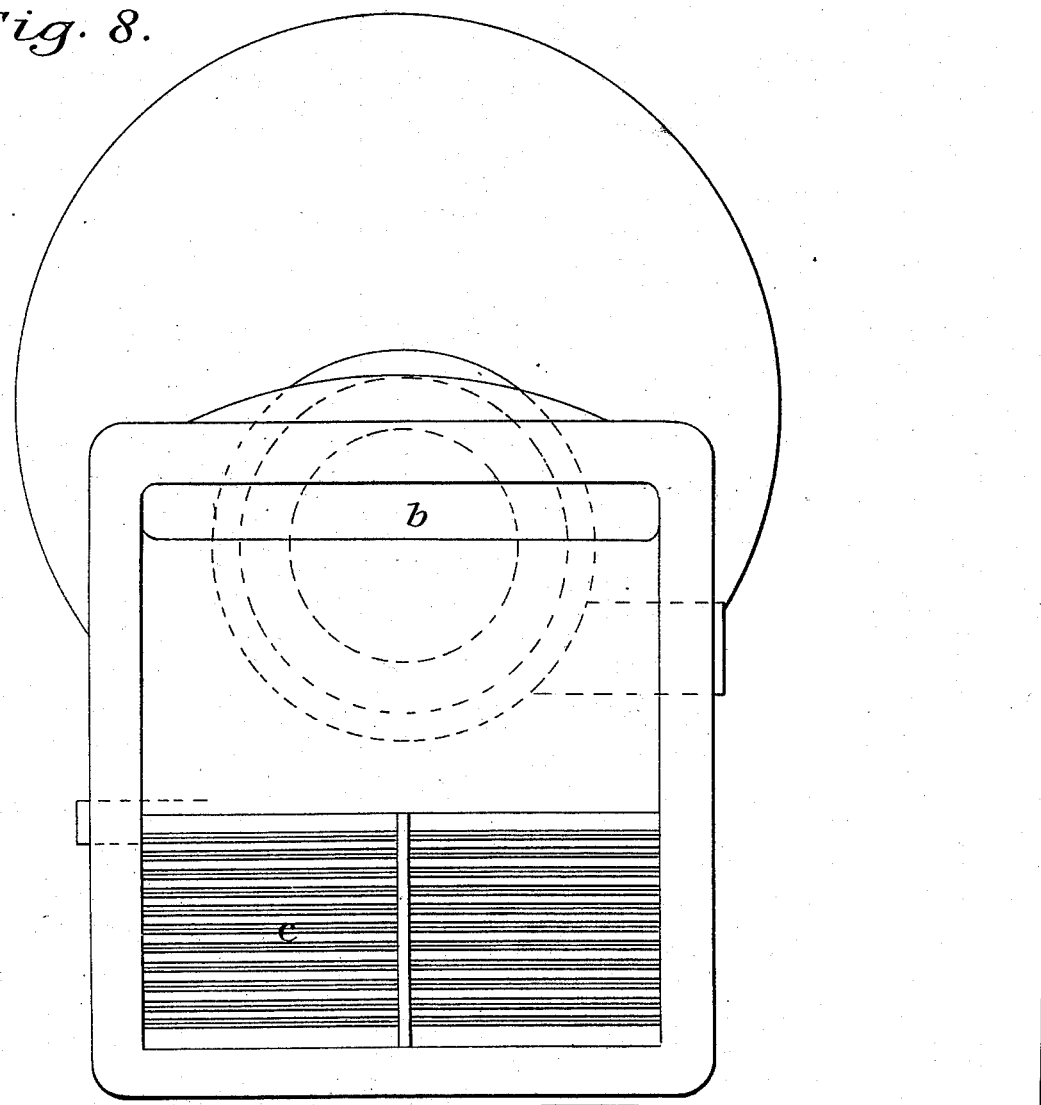
Fig. 8.
Fig. 17.
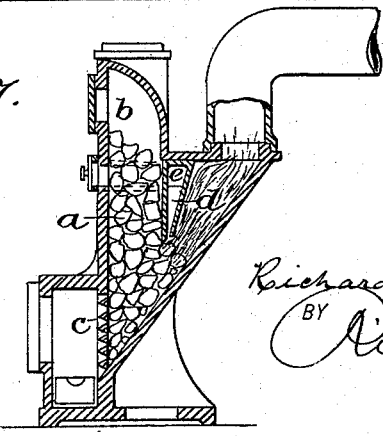
WITNESSES:
E. B. Bolton
H. van Oldenneel
INVENTOR
Richard Leon Puciata
BY Richardson
ATTORNEYS (No Model.) 11 Sheets—Sheet 7.

R. L. PUCIATA.
FURNACE.

No. 567,611. Patented Sept. 15, 1896.

WITNESSES:
E. B. Bolton
H. van Oldenneel

INVENTOR
Richard Leon Puciata
BY
Richards
ATTORNEYS (No Model.) 11 Sheets—Sheet 8.

R. L. PUCIATA.
FURNACE.

No. 567,611. Patented Sept. 15, 1896.

WITNESSES:

INVENTOR
Richard Leon Puciata
BY
ATTORNEYS (No Model.) 11 Sheets—Sheet 9.

R. L. PUCIATA.
FURNACE.

No. 567,611. Patented Sept. 15, 1896.

WITNESSES:

INVENTOR
Richard Leon Puciata
BY
ATTORNEYS (No Model.) 11 Sheets—Sheet 10.
R. L. PUCIATA.
FURNACE.
No. 567,611. Patented Sept. 15, 1896.
*Fig. 12.*
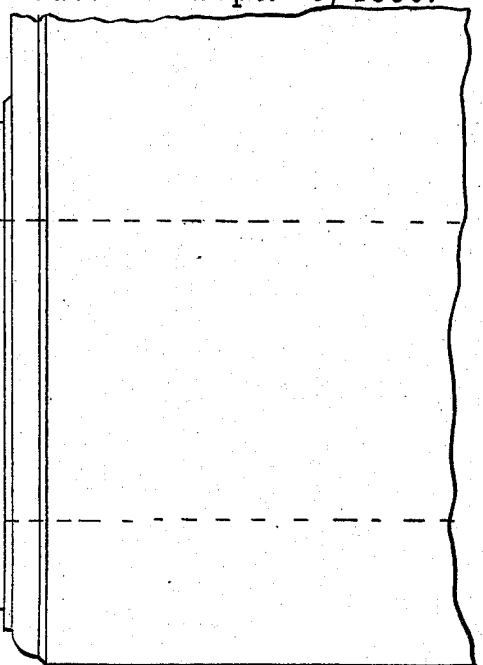
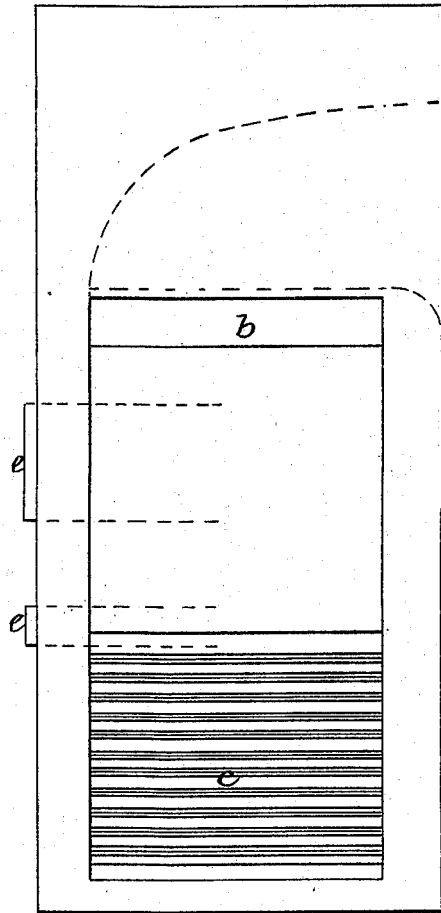
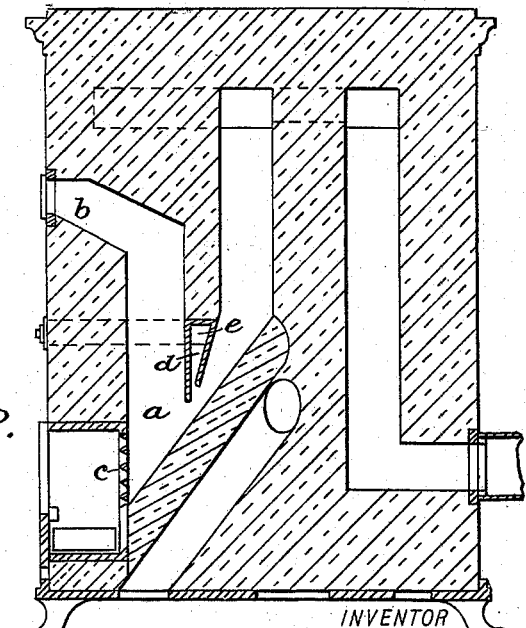
*Fig. 18.*
WITNESSES:
E. B. Bolton
H. van Oldenneel
INVENTOR
Richard Leon Puciata
BY
Richard R
ATTORNEYS (No Model.) 11 Sheets—Sheet 11.
R. L. PUCIATA.
FURNACE.
No. 567,611. Patented Sept. 15, 1896.

WITNESSES:

INVENTOR
Richard Leon Puciata
BY
ATTORNEYS

UNITED STATES PATENT OFFICE.

RICHARD LEON PUCIATA, OF WARSAW, RUSSIA.

FURNACE.

SPECIFICATION forming part of Letters Patent No. 567,611, dated September 15, 1896.

Application filed September 13, 1895. Serial No. 562,433. (No model.)

*To all whom it may concern:*

Be it known that I, RICHARD LEON PUCIATA, a subject of the Emperor of Russia, and a resident of Warsaw, Russia, have invented new and useful Improvements in Furnaces with Vertical Fire-Grates, of which the following is a specification.

My invention relates to smoke-consuming furnaces; and it consists, essentially, of a vertical fuel-chamber having an inclined bottom and a vertically-arranged grate fitted to one of the walls of the vertical fuel-chamber.

Figure 2:
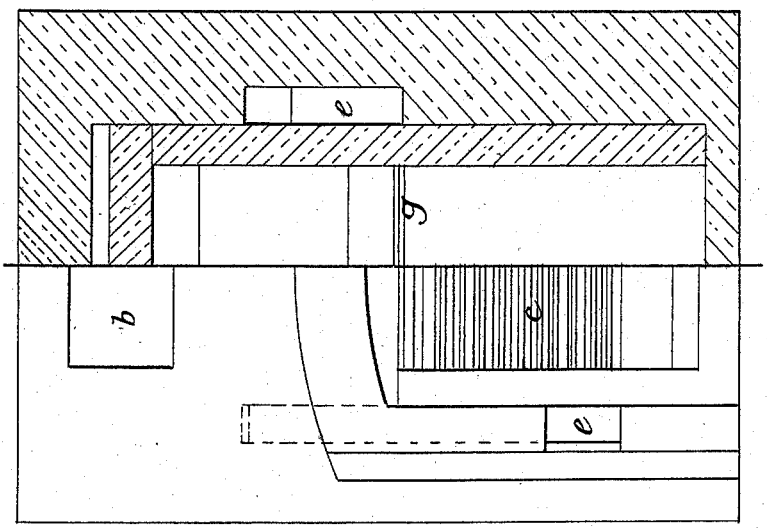
Figure 1:
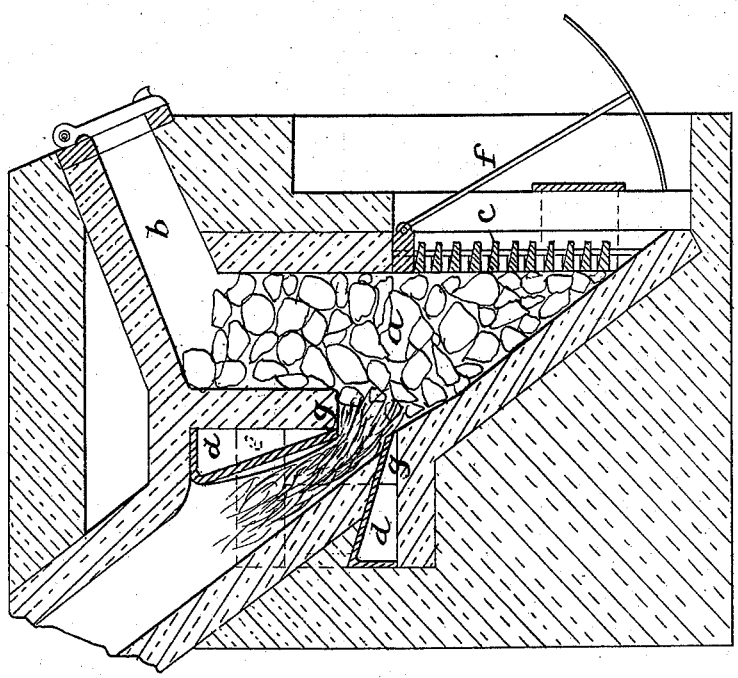
Figure 4:
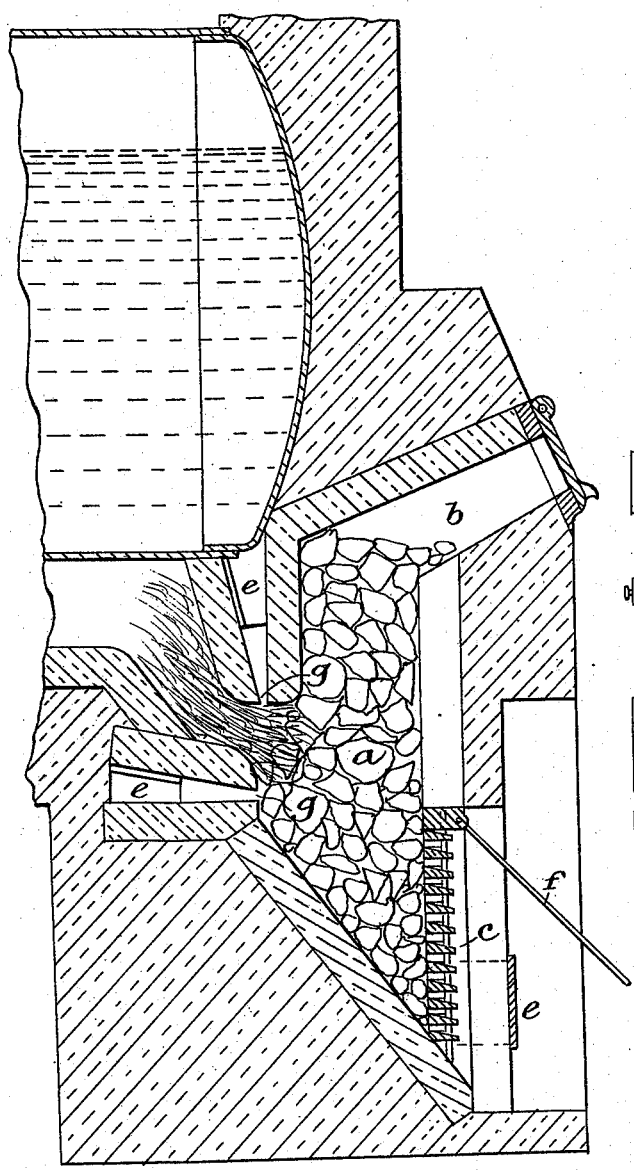
Figure 14:
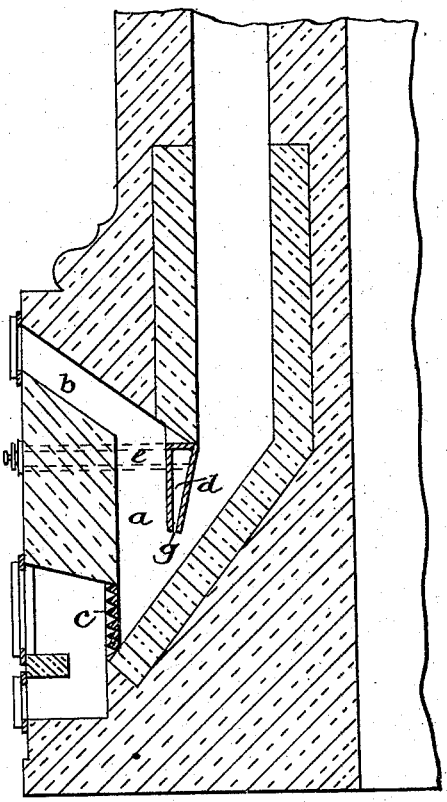
Figure 5:
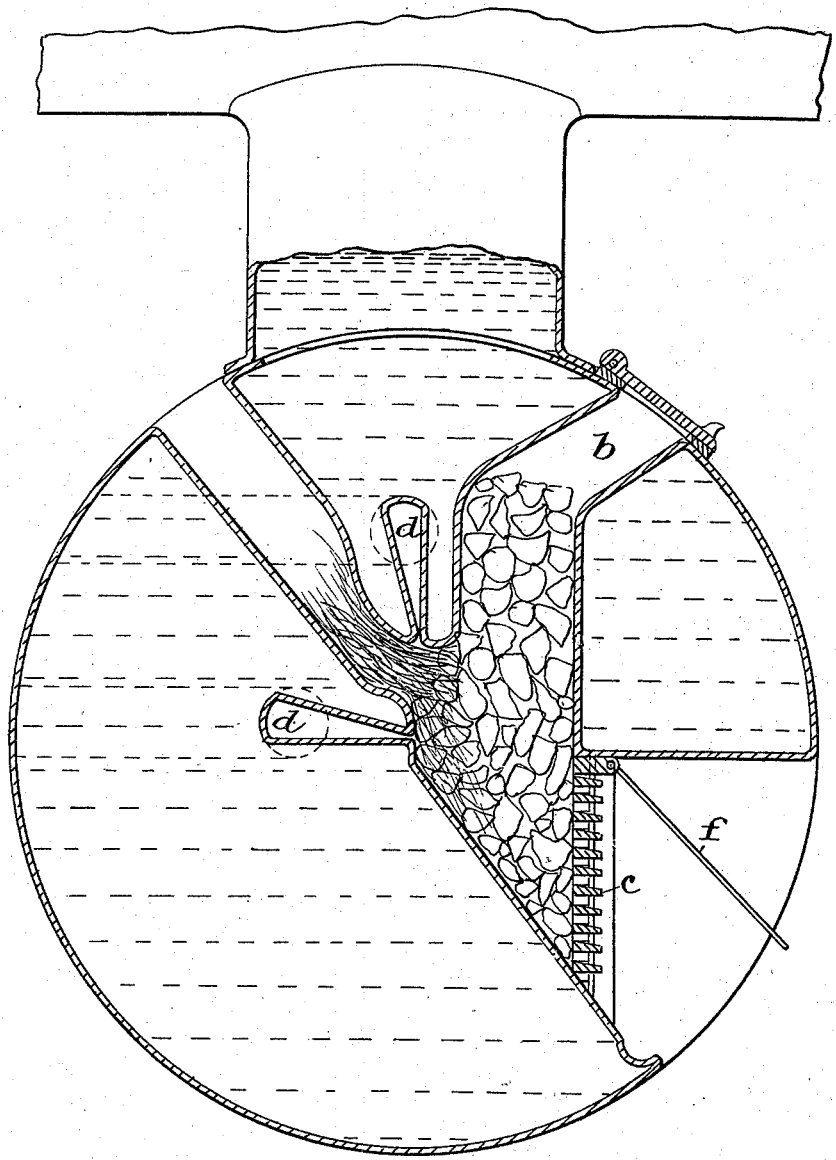
Figure 16:
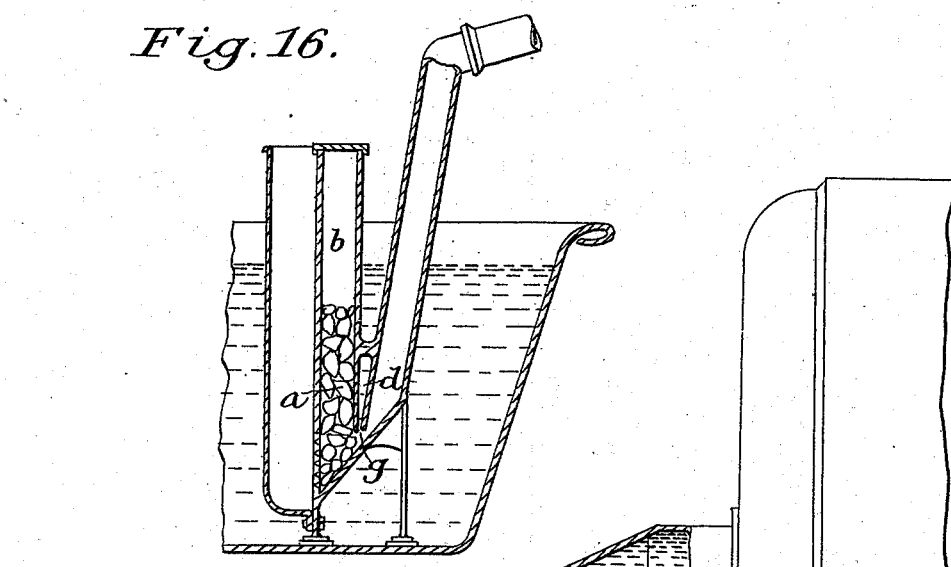
Figure 7:
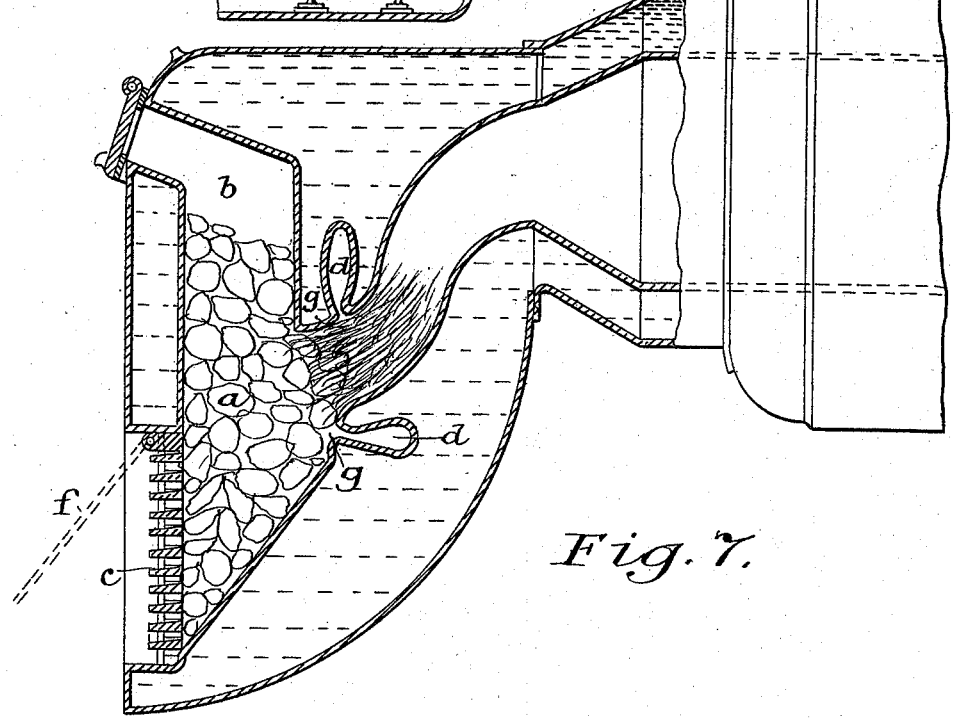
Figure 9:
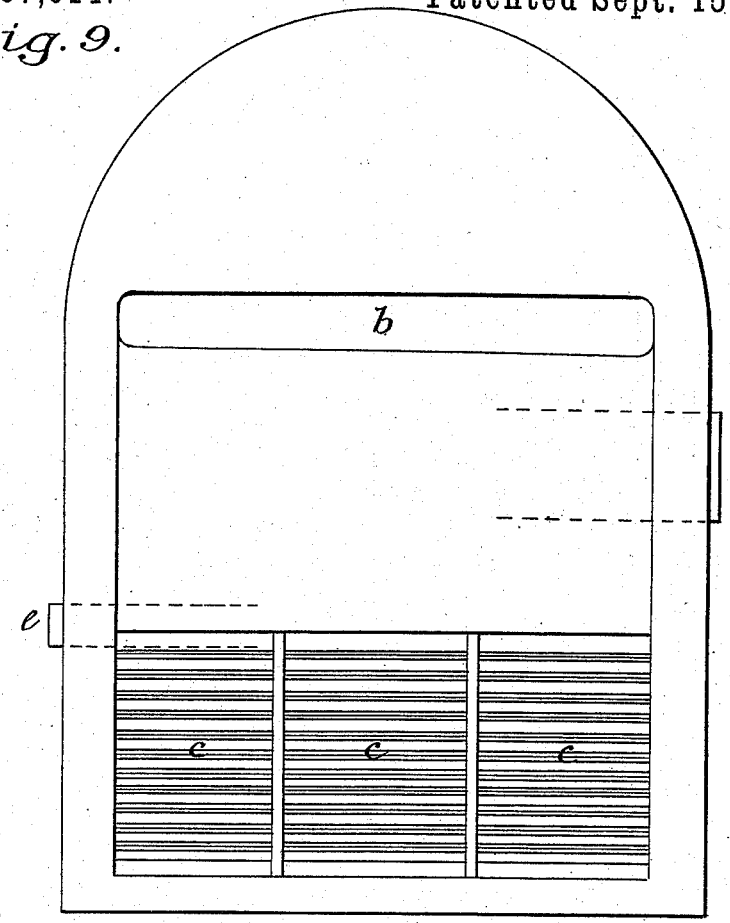
Figure 21:
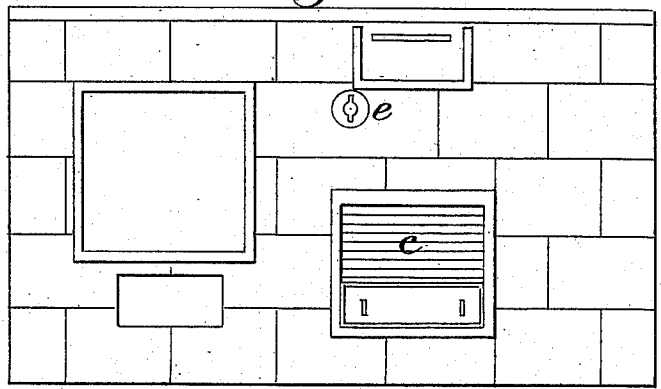
Figure 10:
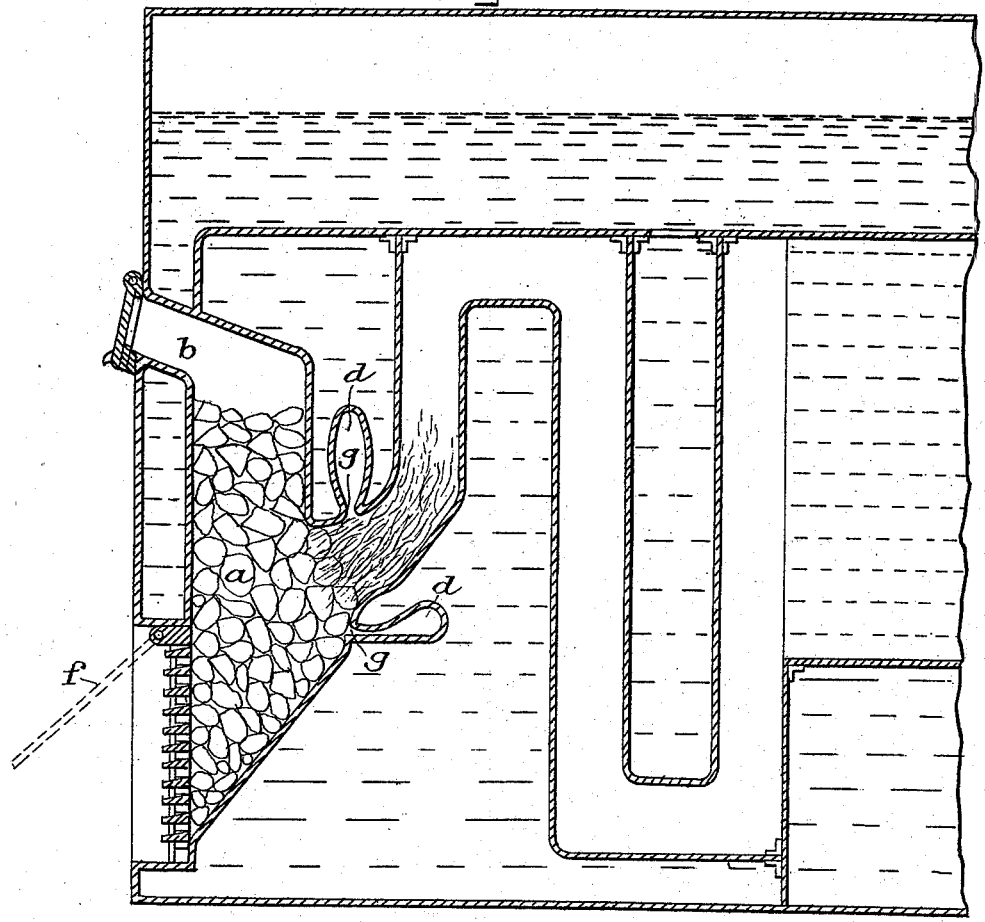
Figure 20:
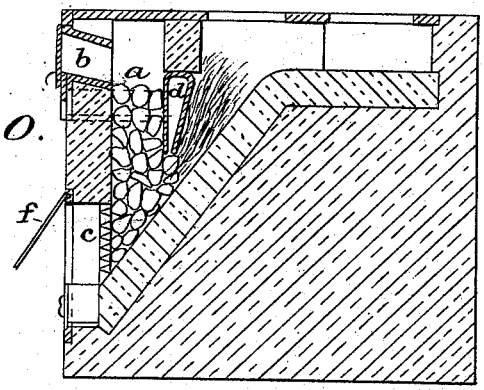
Figure 11:
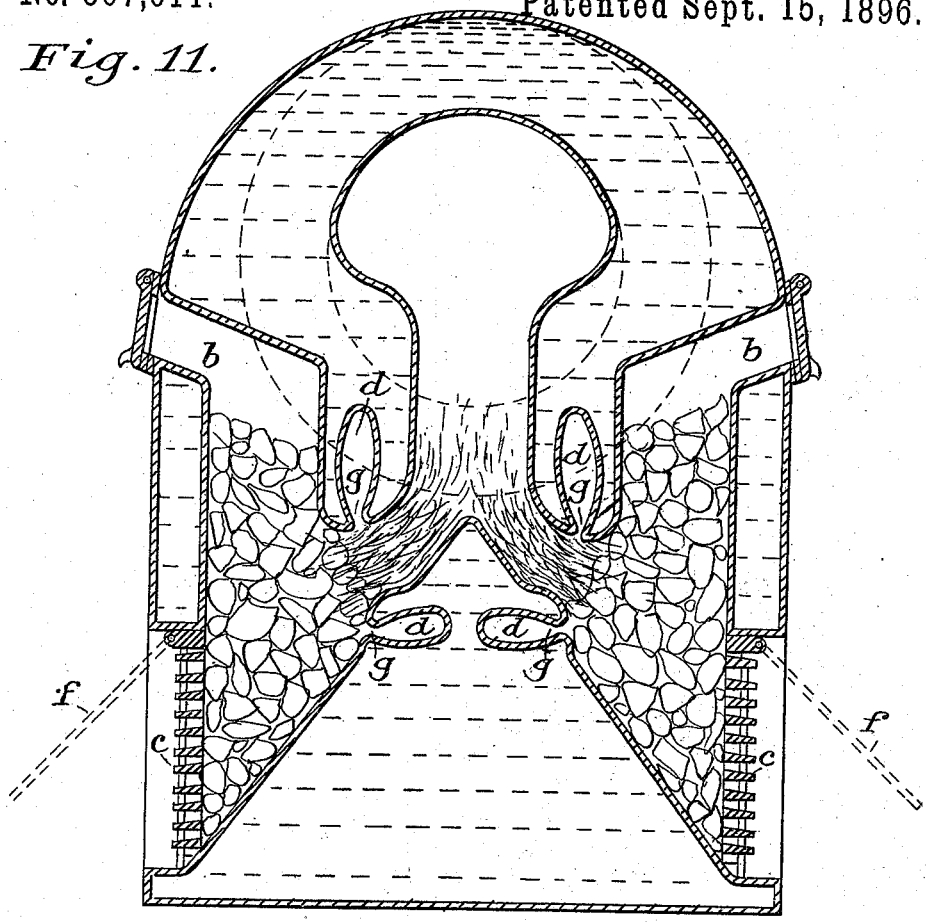
Figure 19:
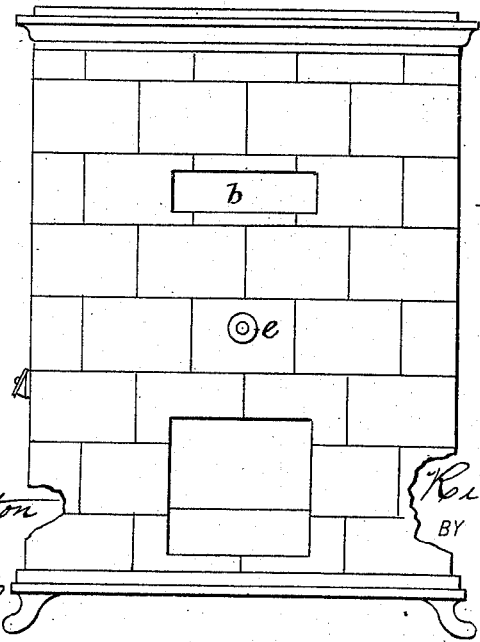
Figure 15:
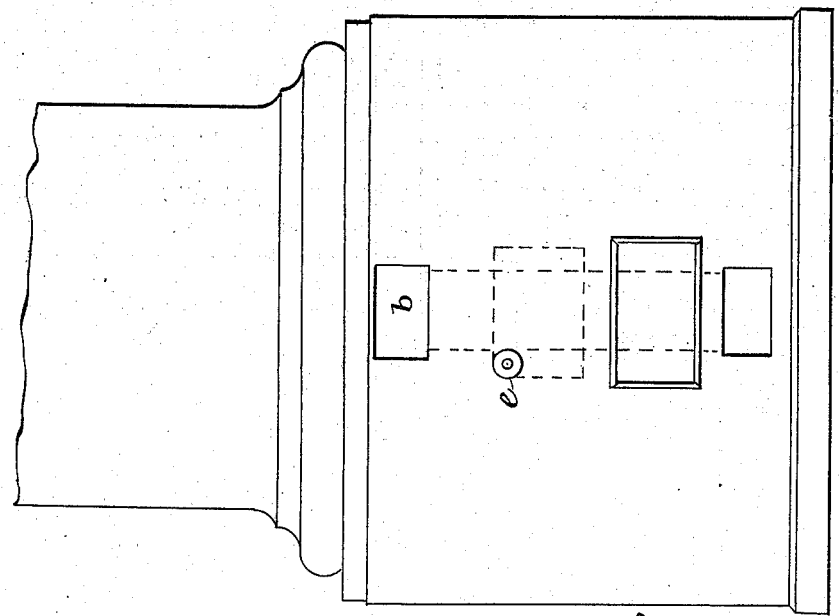
Figure 13:
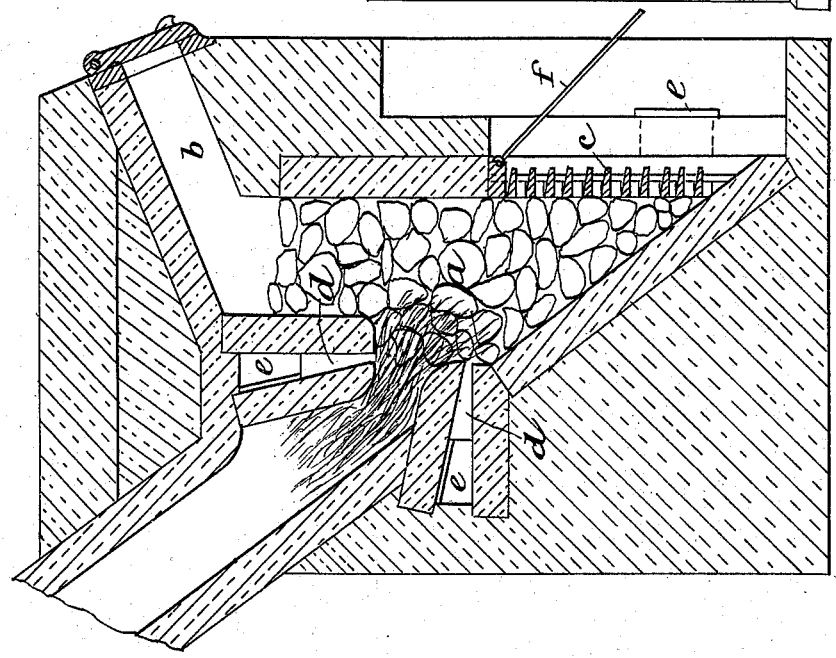

In the accompanying drawings, Figure 1 shows a vertical section of the furnace. Fig. 2 is a front view and vertical section of the same perpendicular to that of Fig. 1. Fig. 3 is a horizontal section. Fig. 4 shows the furnace adapted to a boiler of an engine, all inside walls being of fireproof bricks. Figs. 5 and 6 show a steam-boiler having a furnace of this invention inside. Figs. 7 and 8 show a heater provided with a furnace of this system and applied to a boiler having a heating-tube inside. Figs. 9 and 10 show the furnace adapted to a boiler for movable steam-engines or locomotives, the furnace being placed in the existing fire-chamber. Figs. 11 and 12 show a double furnace of this system applied to existing boilers. Fig. 13 shows the same furnace as Fig. 1 with the pockets or chambers $d$ made of fireproof bricks. Figs. 14 and 15 show an oven provided with the furnace. Fig. 16 shows a small oven for heating water for bath-tubs, &c. Fig. 17 shows an oven of cast-iron or other metal. Figs. 18 and 19 show an oven made of bricks mounted upon a cast-iron foot. Figs. 20, 21, and 22 show how my system of furnace can be applied to kitchen-ranges.

As shown in Fig. 1, the chamber $a$ serves as a fuel chamber or receiver, this chamber being arranged vertically with an inlet $b$, through which the fuel is fed to the chamber $a$. The lower front wall of the chamber is provided with an opening adapted to receive grate-bars $c$, independently removable, and as the bottom of the chamber $a$ is inclined toward the front it will be seen that the fuel feeds toward the vertical grate, being partly supported thereby. A screen $f$ controls the draft at the front of the grate.

Air-chambers $d\ d$ are provided above and below the exit-passage for the products of combustion, and these chambers are supplied with air through conduits $e\ e$, and thus the escaping gases at this point are furnished with a sufficient supply of air for combustion, the air passing out of the chambers $d\ d$ through narrow slits $g\ g$, as shown in Fig. 1.

The other figures of the drawings do not require particular description, as they simply show the furnace adapted to various situations, but with no material change in construction.

Fig. 4 shows the invention applied to a steam-boiler, the walls of the furnace being of fireproof brick. Figs. 5 and 6 show a partial elevation and a sectional view of an application of the furnace within the circumference of a steam-boiler, and may be applied not only to new boilers, but to old boilers as well. Figs. 7 and 8 show in section and end elevation the invention applied to a boiler having an interior heating-tube.

Figs. 11 and 12 show in section and elevation the furnace applied in duplicate as a double furnace, one furnace being upon each side and arranged back to back with a common combustion and heat passage.

The other figures do not require more detailed description than already given.

The fuel feeds gradually down from the cold upper part to the warmer part, reaching the region of combustion in a warm state, which facilitates greatly its chemical combination with the oxygen of the air. The air necessary for the combustion arrives into the furnace through the bars of the grate, and later, when said combustion has acquired the necessary power, a supplementary draft of air is produced by the flame itself, which assures a complete combustion of the generated gases. At the moment that a new supply of air is driven in the temperature of the gases is rather high, (generally much higher than in ordinary furnaces,) and by the construction and location of the pockets or chambers $d$ the current of air cannot lower the temperature to such an extent that the combustion would not be complete. The additional current of air is also sufficiently heated by passing through the conduits $e$.

The whole of the system assures a perfect working of the furnace and regularity of action.

The principal advantages of the furnace are simplicity of construction, which permits the use of grate-bars of all shapes, and the ease with which the furnace is kept in order. All the fireman has to do is to shake the fuel by means of a simple poker through the grate-bars and eventually to remove from time to time said bars, in order to take away the ashes and slag. All kinds of fuel may be used in the same furnace, as wood, coal, peat, and even dust and waste. The thin parts of the fuel passing through the lower bars of the grate can be charged again.

The considerable draft is a great advantage, the possibility of reducing the dimensions of the grate due to its vertical arrangement permitting greater intervals between the bars than ordinary grates. The complete combustion of the gases is assured by the arrangement and especially by the supplementary supply of heated air coming through the pockets or chambers arranged inside. Further, there is a considerable economy of fuel compared with all other systems and especially with the ordinary furnaces.

I claim—

The combination in a furnace of a fuel-chamber having an inclined wall with a vertical plane grating in the front wall of it composed of horizontal reversible grate-bars and with two transverse inner conduits for feeding supplemental air at the exit of furnace-gases, substantially as described and shown.

In testimony whereof I have signed my name to this specification in the presence of two subscribing witnesses.

RICHARD LEON PUCIATA.

Witnesses:
  NICHOLAS TSCHEKALOFF,
  JULIUS BLAU.